United States Patent Office 2,846,400
Patented Aug. 5, 1958

2,846,400
DETERGENT COMPOSITIONS

Alan Dalton Scott, Bebington, and Brian John Hazzard, Birkenhead, England, assignors to Lever Brothers Company, New York, N. Y., a corporation of Maine No Drawing. Application April 17, 1952
Serial No. 282,888

Claims priority, application Great Britain April 23, 1951

6 Claims. (Cl. 252—137)

This invention relates to ionic soapless detergents, and has particular reference to improving their lathering properties.

It has been discovered that certain alkanolamides or their derivatives can increase the persistence of the lather of many ionic soapless detergent compositions during washing at the usual low concentrations.

The present invention provides, therefore, a detergent composition containing an ionic soapless detergent and a compound as hereinafter defined which will improve the persistence, during washing, of the lather given by aqueous solutions of the composition.

The compound will be one of the general formula $$R-(Ar)_n-O-R'-CO-NH-R''-OH$$

where R is a straight chain or branched chain alkyl group, or an acyl group, having from 4 to 10 carbon atoms including at least one straight chain of not less than 4 carbon atoms (counting from the carbon atom attached to the aromatic ring) when $n$ is 1, or from 8 to 14 carbon atoms including a straight chain of at least 8 carbon atoms when $n$ is 0, Ar represents a benzene or naphthalene nucleus, $n$ is 0 or 1, R' and R'' are alkylene radicals, dialkylene ether radicals or polyalkylene polyether radicals, the alkylene radicals or alkylene portions of dialkylene ether radicals or of polyalkylene polyether radicals in R' and R'' containing from 1 to 4 carbon atoms each and R' and R'' containing no more than 10 carbon atoms together.

The alkyl or acyl group may be in the ortho-, meta- or para-position to the ether linkage when $n$ is 1. It has been found, however, that the para-isomers are generally the most efficient.

It is preferred to use compounds in which Ar represents a benzene nucleus which may be further substituted by such substituents as methyl or hydroxyl groups.

The alkylene radicals or portions in R' and R'' may have straight or branched chains. They may be substituted by one or more substituents such as chlorine atoms or hydroxyl or cyano groups, provided each alkylene radical or portion does not contain more than four carbon atoms. A dialkylene ether radical may be represented by the general formula $$-Alk-O-Alk^1-$$

and a polyalkylene polyether radical by the general formula $$-Alk-O-Alk^1-O-Alk^2\ldots-$$

where Alk, Alk¹ and Alk² are alkylene radicals. R' and R'' need not necessarily be the same, nor need the various alkylene portions of any particular dialkylene ether radical or polyalkylene polyether radical be identical.

The following formulae are given to exemplify the compounds which may be incorporated in detergent compositions according to the invention:

p-tert-octylphenoxyacetethanolamide

p-tert-octylphenoxyacetisopropanolamide

p-tert-octylphenoxy-α-propionethanolamide

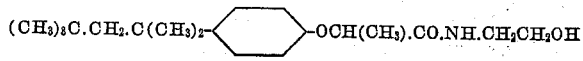

p-tert-octylphenoxy-α-propionisopropanolamide

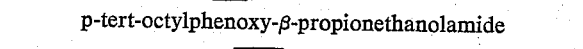

p-tert-octylphenoxy-β-propionethanolamide

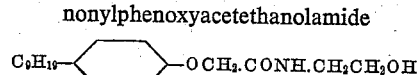

nonylphenoxyacetethanolamide

n-decyloxyacetethanolamide $$C_{10}H_{21}.OCH_2.CONH.CH_2CH_2OH$$

p-n-octylphenoxyacetethanolamide

p-caprylylphenoxyacetethanolamide

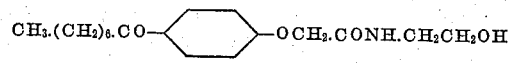

4-caprylyl-3-hydroxyphenoxyacetethanolamide

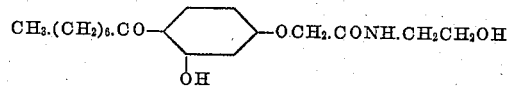

The method of preparation of the compounds is not a feature of the invention. They may be prepared by any known method. As an example, applicable to many of the compounds, there may be given the well-known method which consists of a series of steps represented schematically as:

(X represents a halogen atom and M an alkali metal atom)

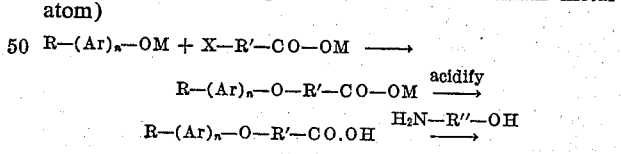

It is often convenient to use, according to the invention, a mixture of compounds, for instance such as will result from the treatment of mixed alkyl or acyl phenols. Such mixtures may contain alkyl or acyl groups, respectively, of varying sizes, or may be isomeric mixtures. Alternatively one particular compound may be synthesized and used as such or in admixture with other compounds according to the invention.

Amongst the factors governing the amount of compounds which may usefully be incorporated in a detergent composition according to the invention there may be mentioned: the particular compound or mixture of compounds to be added and the nature of the detergent, of any builders and diluents present and of the water in which the composition is to be used. Substantial improvement in the persistence of the lather during washing has been obtained with amounts of the compounds ranging up to 50% by weight of the organic ionic detergent present, and even greater amounts calculated on this basis may usefully be incorporated in some cases. On the other hand, it has also been found that too great an amount of the compounds may actually be disadvantageous. Very simple tests will show in each particular case what proportions may usefully be employed. It has been found that for each composition there is a restricted range of proportions of compounds according to the invention which gives maximum improvement in persistence, during washing, of the lather given by aqueous solutions of the composition. This range usually lies below 30%. The minimum amount, below which no useful improvement at all is obtained with a particular composition, may easily be found by simple experiments. Usually, it lies above 1%. In the preferred embodiment of the invention, the amount of the compounds used lies within the range of from 4 to 20% by weight of the organic ionic detergent present.

The compounds may be incorporated in the detergent composition at any suitable stage of the production of the composition. It is obvious that any processing after such incorporation should not involve conditions in which an appreciable proportion of the compounds would volatilise or decompose. Thus, if a detergent powder is to be produced by the well-known process of spray-drying a slurry, any compound liable to volatilise or decompose under the spray-drying conditions should be added to the resultant powder and not to the slurry.

The improvement in the persistence of the lather during washing at the usual low concentrations achieved according to the invention is generally more marked in soft water than in hard. This is to be expected, since most soapless detergents and compositions containing them give a more persistent lather in hard water than in soft. Some ionic detergents and compositions containing them now on the market give a lather in hard water which has a persistence during washing of such an order that no demonstrable improvement may result from the addition of compounds according to the invention when the composition containing these detergents is used in hard water. Noticeable improvement in soft water may, however, often be obtained even with such compositions, provided a suitable amount of the compounds is incorporated. The invention makes it possible not only to improve the persistence of the lather during washing of a given composition, but also to provide a detergent composition which gives a lather of similar persistence to that given by a detergent composition containing a greater proportion of detergent.

The improvement achieved according to the invention is particularly marked with detergent compositions containing certain sulphonated alkyl aryl hydrocarbon detergents, such as the sodium salt of a sulphonated dodecyl (tetrapropylene polymer) toluene, but noticeable improvements may also be obtained with compositions containing other sulphonated alkyl aryl hydrocarbons, such as, for instance, the sodium salt of a sulphonated dodecyl (tetrapropylene polymer or keryl) benzene, or other anionic soapless detergents, such as sulphated fatty alcohols or secondary alkyl sulphates. Improvements have also been obtained with detergent compositions containing cationic detergents.

When compounds according to the invention are incorporated in ionic detergent compositions containing, in addition to an organic soapless anionic detergent, an alkali metal salt of a fatty acid (soap), it has been noted that some of the compounds described are capable of making the depression in lathering power caused when soap is admixed with organic anionic soapless detergents. It has also been noted that the addition of the compounds to compositions containing soap and an organic anionic soapless detergent reduces the amount of soapless detergent which is necessary substantially to eliminate scum formation when the composition is used in hard water. In particular this applies to compositions in bar form.

Organic ionic soapless detergents are usually employed in the form of their salts. They may be used alone or, in many cases, admixed with one another. Commonly they are used in admixture with inorganic or organic diluents or builders, such as sulphates, silicates, carbonates, phosphates, and salts of carboxymethylcellulose. It has been found that the improvement in the persistence of the lather during washing is more marked with compositions containing such builders, in particular phosphates like tetrapyrophosphates, such as tetrasodium pyrophosphate, or tripolyphosphates, such as pentasodium tripolyphosphate.

A detergent composition according to the invention may have any of the physical forms in which detergent compositions are commonly marketed.

The improvement obtained according to the invention is maintained under a wide variety of conditions of use, such as dish-washing, clothes-washing and hair shampooing.

The following examples illustrate various types of compositions in accordance with the invention.

*Example 1*

1.5% of p-tert-octylphenoxyacetethanolamide was incorporated in a detergent powder. The final powder contained:

21.5% by weight of the sodium salt of a commercial dodecyl (tetrapropylene polymer) toluene sulphonic acid 22.5% by weight tetrasodium pyrophosphate 1.5% by weight p-tert-octylphenoxyacetethanolamide 54.5% by weight inorganic builders other than tetrasodium pyrophosphate A similar detergent powder was made up which differed from the former only in that it did not contain a compound according to the invention, but contained 56% of inorganic builders apart from pyrophosphate. The two compositions were compared in dish-washing tests in waters of 24° and 4° hardness at various concentrations of organic ionic detergent in the test solution. In each test the number of uniformly soiled dinner plates was recorded which could be washed before the lather of the test solution was destroyed. The results tabulated below show that the particular detergent composition gives a very satisfactorily persistent lather in hard water, which persistence cannot, therefore, be increased noticeably by the addition, according to the invention, of the compound when incorporated in the proportion used. On the other hand, a very marked increased is obtained in soft water.

|  |  | Powder not containing alkanolamide | Powder containing alkanolamide |
| --- | --- | --- | --- |
| Water of 24° hardness | 0.025% by weight organic ionic detergent in test solution. | 18 | 18–19 |
| Water of 4° hardness | do | 1 | 3 |
| Do | 0.05% by weight organic ionic detergent in test solution. | 5–6 | 18 |

*Example 2*

A number of detergent compositions in powder form were made up containing:

21.5 parts by weight of the sodium salt of a commercial secondary alkyl sulphuric acid 22.5 parts by weight tetrasodium pyrophosphate 56.0 parts by weight sodium sulphate The compositions also contained varying amounts of p-tert-octylphenoxyacetethanolamide. The compositions were compared in dish-washing tests similar to those described in Example 1 with a control composition which differed from the compositions under test by not containing any alkanolamide. The concentration of organic ionic detergents in the test solution was 0.05%. The results obtained are tabulated below.

|  | Number of plates washed in water of— | |
|---|---|---|
|  | 4° hardness | 24° hardness |
| Control | 3 | 3 |
| Control+1 part by weight of alkanolamide | 5 | 5–6 |
| Control+2 parts by weight of alkanolamide | 4–6 | 8–9 |

*Example 3*

A detergent powder was made up, corresponding to the control powder of Example 1 to which there were added 2 parts by weight of p-nonylphenoxyacetethanolamide. Dish-washing tests similar to those described in Example 1 were carried out in water of 4° hardness. The concentration of organic ionic detergent in the test solution was 0.05%. The results obtained were:

Number of plates washed
Control _____ 4–5
Control+2 parts by weight of alkanolamide _____ 14–15

*Example 4*

A detergent powder was made up of the following formulation:

19 parts by weight of a commercial sodium dodecyl (tetrapropylene polymer) benzene sulphonate
40 parts by weight of a mixture of tetrasodium pyrophosphate and pentasodium tripolyphosphate
39 parts by weight various builders (mainly sodium sulphate)

Dish-washing tests similar to those described in Example 1 to compare this control powder with a powder which in addition contained 2 parts by weight of p-tert-octylphenoxyacetethanolamide were carried out in waters of 4° and 24° hardness. The concentration of organic ionic detergent in the test solution was about 0.045%. The results obtained were:

|  | Number of plates washed in water of— | |
|---|---|---|
|  | 4° hardness | 24° hardness |
| Control | 9–10 | 17–19 |
| Control+2 parts by weight of alkanolamide | 13 | 20 |

*Example 5*

Dish-washing tests as in Example 1 were carried out in water of 4° hardness with powders similar to those tested in Example 1 except that in the powder containing the compound according to the invention the compound was n-decyloxyacetethanolamide. The results obtained with test solutions containing 0.05% organic ionic detergent were:

Number of plates washed
Control _____ 4
Control+2% alkanolamide _____ 14

Similar tests were carried out with powders where the sodium salt of a commercial dodecyl toluene sulphonic acid had been replaced by the sodium salt of a commercial secondary alkyl sulphuric acid. The results obtained were:

Number of plates washed
Control _____ 3
Control+2% n-decyloxyacetethanolamide _____ 6

We claim:
1. A detergent composition consisting essentially of an alkylaryl sulfonate detergent selected from the group consisting of sodium dodecyl toluene sulfonate and sodium dodecyl benzene sulfonate and from about 1% to about 50% by weight of the detergent of an alkanolamide which will improve the persistence, during washing, of the lather given by aqueous solutions of the composition, said alkanolamide being selected from the group consisting of para-tertiary-octylphenoxyacetethanolamide, para-nonylphenoxyacetethanolamide, and n-decyloxyacetethanolamide.

2. A detergent composition as set forth in claim 1 wherein the amount of alkanolamide is from about 1% to about 30% by weight of the detergent.

3. A detergent composition as set forth in claim 1 wherein the amount of alkanolamide is from about 4% to about 20% by weight of the detergent.

4. A detergent composition as set forth in claim 1 containing a sodium polyphosphate builder.

5. A detergent composition as set forth in claim 4 wherein the sodium polyphosphate builder is tetrasodium pyrophosphate.

6. A detergent composition as set forth in claim 4 wherein the sodium polyphosphate builder is pentasodium tripolyphosphate.

References Cited in the file of this patent
UNITED STATES PATENTS

| 2,576,913 | Baird et al. | Dec. 4, 1951 |
| 2,607,740 | Vitale et al. | Aug. 19, 1952 |
| 2,704,280 | Trowbridge | Mar. 15, 1955 |

UNITED STATES PATENT OFFICE
CERTIFICATE OF CORRECTION

Patent No. 2,846,400                                          August 5, 1958

Alan Dalton Scott et al.

It is hereby certified that error appears in the printed specification of the above numbered patent requiring correction and that the said Letters Patent should read as corrected below.

Column 3, line 69, after "making" insert -- good --; column 4, line 51, for "increased" read -- increase --.

Signed and sealed this 28th day of October 1958.

(SEAL)

Attest:

KARL H. AXLINE
Attesting Officer

ROBERT C. WATSON
Commissioner of Patents